United States Patent
He et al.

(10) Patent No.: US 8,542,869 B2
(45) Date of Patent: Sep. 24, 2013

(54) PROJECTION BASED HASHING THAT BALANCES ROBUSTNESS AND SENSITIVITY OF MEDIA FINGERPRINTS

(75) Inventors: Junfeng He, New York, NY (US); Regunathan Radhakrishnan, San Bruno, CA (US); Claus Bauer, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 259 days.

(21) Appl. No.: 13/115,542

(22) Filed: May 25, 2011

(65) Prior Publication Data
US 2011/0299721 A1 Dec. 8, 2011

Related U.S. Application Data

(60) Provisional application No. 61/350,879, filed on Jun. 2, 2010.

(51) Int. Cl.
*G06K 9/00* (2006.01)

(52) U.S. Cl.
USPC ......................................... 382/100

(58) Field of Classification Search
USPC ............... 382/100, 232; 380/54, 210, 252, 380/287; 713/176; 704/200.1, 273; 381/73.1; 348/460, 463
See application file for complete search history.

(56) References Cited

U.S. PATENT DOCUMENTS

| | | | | |
|---|---|---|---|---|
| 7,487,180 B2* | 2/2009 | Holm et al. | ............................ | 1/1 |
| 7,831,832 B2* | 11/2010 | Kozat et al. | .................... | 713/176 |
| 8,351,643 B2* | 1/2013 | Radhakrishnan et al. | .... | 382/100 |
| 8,406,462 B2* | 3/2013 | Radhakrishnan et al. | .... | 382/100 |
| 2006/0047967 A1* | 3/2006 | Akhan et al. | .................. | 713/176 |
| 2009/0136083 A1* | 5/2009 | Picard et al. | .................. | 382/100 |
| 2011/0142348 A1* | 6/2011 | Radhakrishnan et al. | .... | 382/195 |
| 2011/0268315 A1* | 11/2011 | Bauer et al. | ................... | 382/100 |
| 2013/0064416 A1* | 3/2013 | Radhakrishnan et al. | .... | 382/100 |

OTHER PUBLICATIONS

Fridrich, J. et al., "Robust Hash Functions for Digital Watermarking" ITCC 2000.
Radhakrishnan, et al. "On Improving the Collision Property of Robust Hashing Based on Projections" Proc ICME 2009, pp. 862-865.
Hyvarinen Aapo, "Fast and Robust Fixed-Point Algorithms for Independent Component Analysis" IEEE Transactions on Neural Networks, vol. 10, No. 3, May 1999 pp. 626-634.
He, et al., "Locality Preserving Projections" NIPS 2003.

* cited by examiner

*Primary Examiner* — Anand Bhatnagar

(57) ABSTRACT

Multiple candidate feature components of media content or projection matrices (or other hash functions, e.g., non-linear projections) are identified. Each of the candidate projection matrices (or other hash functions) includes an array of coefficients that relate to the candidate features. A subgroup of the candidate features or the projection matrices (or other hash functions) are selected based at least partially on an optimized combination of at least two characteristics of the candidate features or projection matrices (or other hash functions). Media fingerprints that uniquely identify the media content are derived from the selected optimized subgroup. Optimal projection matrices (or other hash functions) may be designed. Performance or sensitivity (e.g., search time) characteristics of the fingerprints are thus balanced with robustness characteristics thereof.

15 Claims, 3 Drawing Sheets

Example extraction of candidate fingerprint bits from media content using multiple types of features and multiple type of projections Example extraction of candidate fingerprint bits from media content using multiple types of features and multiple type of projections

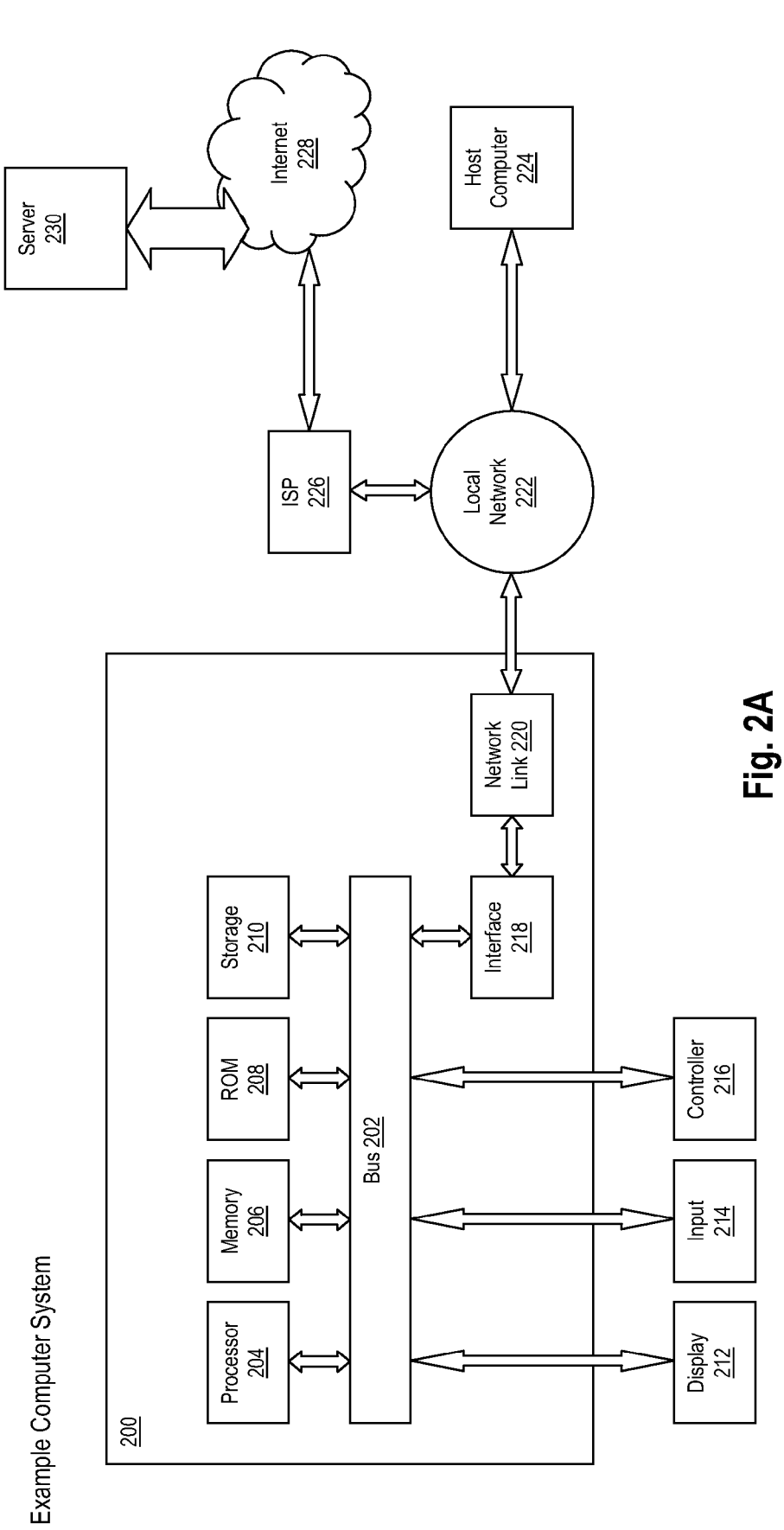

US 8,542,869 B2

PROJECTION BASED HASHING THAT BALANCES ROBUSTNESS AND SENSITIVITY OF MEDIA FINGERPRINTS

RELATED U.S. APPLICATION AND PRIORITY CLAIM

The present Application is related and claims priority benefit to co-pending U.S. Provisional Patent Application No. 61/350,879 filed 2 Jun. 2010 by Junfeng He, et al. entitled Projection Based Hashing that Balances Robustness and Sensitivity of Media Fingerprints, which is incorporated herein by reference in its entirety as if fully set forth herein.

TECHNOLOGY

The present invention relates generally to media fingerprints. More particularly, an embodiment of the present invention relates to projection based hashing that balances robustness and sensitivity of media fingerprints.

BACKGROUND

Media fingerprints are compact and unique bit stream identifiers that are derived from, or comprise components that may be extracted from, underlying media content. Media fingerprints are robust to modifications on content such as transcoding, geometric distortion, and various attacks. Media fingerprints can be efficiently stored in a database and searched to enable content identification applications. Example applications of media fingerprinting technology includes the detection of copyrighted material streaming in the internet, broadcast monitoring, retrieval of enhancement metadata during content playback, synchronizing audio and video portions of multimedia content, and metadata propagation in broadcast studios.

Extracting media fingerprints from underlying media content typically includes extraction of robust features of the media content, and extracting a robust hash signature from the extracted features. Extracting the robust features allows those features to compactly represent the underlying perceptual content with invariance under various processing operations. Robust hash extraction has two effectively competing requirements.

First, robust hash extraction allows fingerprint bits that are extracted from modified instances of the content (e.g., off speed playout, in which the modified content instance has essentially been re-recorded from an original instance of the content at a slightly different speed) to be similar to fingerprints that are extracted from the original content instance. Thus, relatively small changes in feature values do not result in drastic changes in the extracted hash bits, which imparts robustness to the fingerprints. Second, robust hash extraction allows the extracted fingerprint bits to be unique, which affects search time, e.g., the time taken to find a match in a database of media fingerprints.

For example, a database of media fingerprints is searchable for identifying content. At the time the database is constructed, each fingerprint codeword is used for indexing, e.g., in a hash table. Each fingerprint codeword in the hash table links to the location in a fingerprint file or to media where that fingerprint codeword is present. The number of links per fingerprint index in the hash table may be referred to herein as a number of collisions.

The more unique a fingerprint codeword is, the more quickly its match may be found in the database, e.g., as a return on a query over the database. As a fingerprint's uniqueness is reduced however, database queries may demand more look-ups, and computing a best pick, e.g., a best match in terms of smallest distance from the query fingerprint. Thus, fingerprints that have a small number of average collisions per fingerprint codeword have shorter search durations. Fingerprints with a smaller number of average collisions per fingerprint codeword are more scalable for searching through a large database of fingerprints than other fingerprints, for which the average number of collisions is higher.

Robust hash functions have been proposed that are based on projection of a feature matrix Q onto a set of pseudo-random matrices. For example, proposed pseudo-random matrices had elements that are uniformly distributed in the range [−0.5, 0.5]. The projected values are compared against a threshold of 0 to derive the hash bits. However, the average number of collisions for fingerprints extracted according to this approach is usually large. Imposing certain conditions on the projection matrices may improve the average number of collisions.

For example, conditions have been imposed on the projection matrices $P_i$ (i=1, 2, . . . K) in which K represents the number of signature bits derived from a feature matrix Q. An offline training set is used to improve the collision property. Projecting the feature matrix Q onto a set of pseudo-random matrices, and imposing conditions on the projection matrices, both strive to select the matrices that minimize cross-correlation among the projected features. Projecting the feature matrix Q onto a set of pseudo-random matrices uses an iterative procedure to select the matrices that satisfy a cross-correlation threshold. However, the approach does not consider optimizing the selected projection matrices in terms of achieving optimal fingerprinting system performance. Imposing conditions on the projection matrices may use singular value decomposition (SVD) of the feature covariance matrix to achieve a zero cross-correlation of the projected values, which optimizes the projections and reduces search latency.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A and FIG. 2B respectively depict an example computer system platform, and an example IC platform, with which embodiments of the invention may be implemented.

DESCRIPTION OF EXAMPLE EMBODIMENTS

Figure 1:
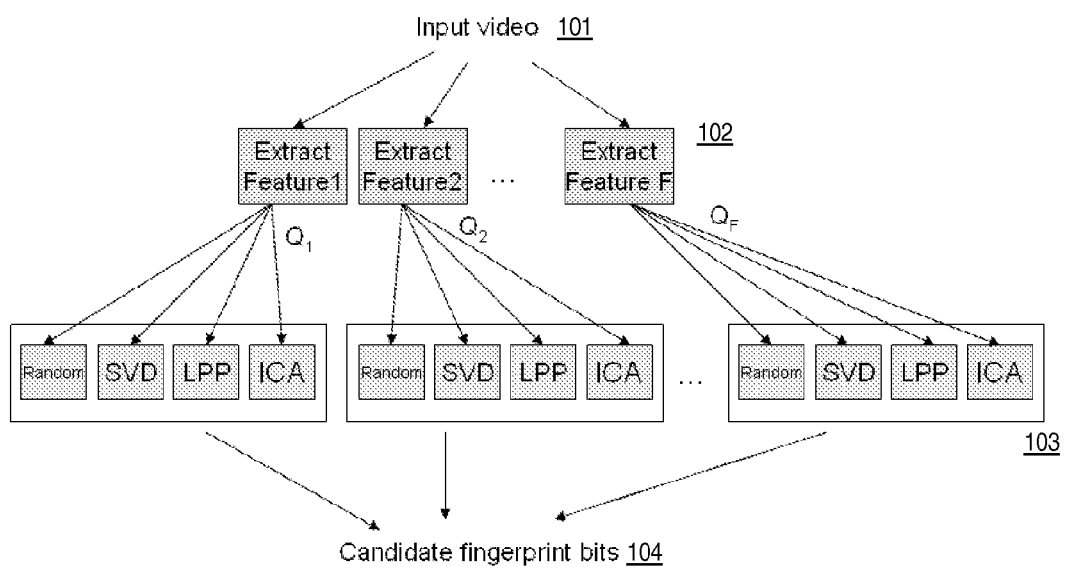
FIG. 1 depicts an example extraction of candidate fingerprint bits from media content using multiple types of features and multiple type of projections, according to an embodiment of the invention.

Projection based hashing that balances robustness and sensitivity of media fingerprints is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Multiple candidate feature components of media content or projection matrices are identified. Each of the candidate projection matrices include an array of coefficients that relate to the candidate features. A subgroup of the candidate features or the projection matrices are selected based at least partially on an optimized combination of at least two characteristics of the candidate features or projection matrices. Media fingerprints that uniquely identify the media content are derived from the selected optimized subgroup. Optimal projection matrices may be designed. Performance or sensitivity (e.g., search time) characteristics of the fingerprints are thus balanced with robustness characteristics thereof.

Overview

An embodiment of the present invention relates to deriving media fingerprints based on projections of feature values that are extracted from the media content. A tradeoff is faced between the competing requirements of robustness, e.g., to transcoding and geometric or other attacks, and the sensitivity with which a fingerprint uniquely identifies a particular portion of media content. A fingerprinting system's performance can be characterized by search accuracy and the search time. Search accuracy measures relate to how often the system correctly identifies an instance (e.g., version) of reference media content, given a modified version of the reference content as a query. Search time relates to the average time the system takes to find a match from the database. The robustness of a fingerprint relates to the search accuracy. The sensitivity of a fingerprint relates to the search time. As used herein, values that relate to the sensitivity of fingerprints may be referred to, essentially synonymously, as a search time performance measurement related to the fingerprints. Fingerprint robustness allows a match to be computed for query content that comprises a modified version of certain reference content in the database. In contrast, fingerprint sensitivity, e.g., a search time performance measurement associated with the fingerprint, maintains the uniqueness of fingerprint code words, notwithstanding a growing amount of database content, for instances as the number of hours of audio and video data increases in the database over time. Typically, the less unique a media fingerprint is, the more time it takes to compute a query over a database to find that fingerprint.

Embodiments of the present invention relate to tradeoffs, which balance the robustness (search accuracy performance measurement) and the sensitivity (search time performance measurement) of fingerprints that are derived from media content. Projection matrices are selected or designed that meet a desired robustness/performance trade-off. The disclosed techniques allow query accuracy and search time to be balanced for any particular application. For a fingerprint database of a certain size (e.g., 200,000 hours of audio/video media content at a given frame rate), a particular design query time specified, desired or required by a certain application (e.g., 1 second) places a constraint on the performance of the fingerprints derived from the query content. Embodiments of the present invention relate to finding the most robust fingerprints that meet the specified search time (sensitivity) criteria.

In an embodiment, projection matrices are designed for robust media hashing based on projections, considering both robustness and sensitivity of the fingerprints derived from a media content portion, using an offline training set. The design may be based on a modified Fast Independent Component Analysis (ICA) algorithm. In an embodiment, fingerprints are derived from a media content portion using multiple types of features. Optimal features are selected in view of both robustness and performance of the extracted fingerprints. Selecting a set of optimal features from a set of candidate features may be performed based on a modified dynamic programming (DP) process.

Selecting Optimal Projection Matrices and Features

Replacing pseudo-random projection matrices with the projection matrices obtained from SVD of a feature covariance matrix allows the average number of collisions for the resulting fingerprints to decrease. With SVD based projection matrices, projected feature values are uncorrelated, which is a weak form of independence. An embodiment reduces search latency beyond SVD based projections with projection matrices that create not just uncorrelated projected values but independent projected values.

To obtain independent projected values, an embodiment estimates independent component analysis (ICA) basis vectors from the features of media content that are obtained from an offline training set. ICA may be computed for the features with a fast ICA process. An embodiment computes a particular set of projection matrices with one or more of various basis decomposition methods (e.g., SVD, ICA, pseudo-random, or as described below, locality preserving projections) obtained from analysis of features from a training set offers a certain tradeoff between robustness and search time, which relates to the average number of collisions.

FIG. 1 depicts an example extraction of candidate fingerprint bits from media content using multiple types of features and multiple types of projections, according to an embodiment of the invention. A training set D contains both reference video, e.g., an original or unmodified instance of audio and/or video content, and modified versions of the reference video. For each fingerprint codeword that is derived from the reference content, a corresponding fingerprint codeword is derived from the modified content.

For each set of fingerprint codewords, (e.g., at least one fingerprint derived from the reference content and at least one fingerprint derived from the corresponding modified content instance), one or more difference values may be computed based on the difference between the fingerprint codeword derived from the original content and the fingerprint codeword derived from the modified content. An embodiment may compute difference values from features or projected values.

From the training set D, a number F of types of features $(Q_1, Q_2, \ldots Q_F)$ is extracted from each video or other media instance. Extracting multiple types of features helps improve search time. For example, an embodiment functions based in part on an assumption that each type of feature captures or expresses an independent aspect about the video or other media content. Example feature $Q_1$ may capture or express how color and/or intensity information, or other image related information (e.g., shape, contour, edges, etc.) is distributed across a video or image frame (or e.g., the intensity of a portion of an audio signal) and the feature $Q_2$ may capture or express information that relates to motion in the video, such as motion vectors (or other image related information). In combination, these two features increase the uniqueness of the fingerprint. Combining more than two features may further increase the uniqueness of the fingerprint. Increasing the uniqueness of the fingerprint relates to its sensitivity, and thus to the search time performance measurements that may be associated with the fingerprint.

Where $p_i$ represents a probability that two unrelated videos have similar $Q_i$ features, the probability that the combined feature will be similar is equal to the product of the probabilities ($p_1, p_2 \ldots p_i \ldots p_F$), which may be significantly and is much smaller than $p_i$. Combining multiple features for fingerprint extraction thus improves search times with an increased uniqueness of the fingerprint codewords computed therewith.

An embodiment projects each feature onto multiple sets of projection matrices and generates candidate fingerprint bits. The candidate fingerprint bits are generated with quantization of each of the projected values. FIG. 1 depicts four example sets of projection matrices. Embodiments may use fewer or more than four sets of projection matrices. The example projection matrix sets include SVD-based matrices, ICA-based matrices, locality preserving projections (LPP) based matrices, and pseudo-random matrices (e.g., marked "Random" in FIG. 1). Embodiments may function with any adequate hash function, such as projection matrices. While projection matrices are described herein with reference to the example embodiments, it should be understood that the selection of projection matrices as an example embodiment is for descriptive purposes relating to uniformity, simplicity and brevity is are not meant to be considered limiting. Except as expressly stated otherwise, the terms "hash function" and "projection matrices" are used herein synonymously throughout. The example projection matrices can thus be considered as hash functions that map a feature vector to one or more fingerprint bits. In general, there can be other hash functions that map features to fingerprint bits. Instead of using linear projection matrices such as SVD-based matrices, ICA-based matrices, an embodiment uses non-linear projections of the candidate features and derives bits from them. We use the term projection matrices interchangeably with hash functions to include any function that maps features to fingerprint bits, unless expressly stated otherwise. In an embodiment, the training sets from which the sets of projection matrices are determined are independent or differ from the training set D, from which the features are extracted.

Pseudo-random matrices may have elements from either a Uniform distribution, e.g., [−0.5, 0.5] or Gaussian distribution, e.g., (0, 1). Pseudo-random matrices may also be selected such that the cross-correlation of the projected values is below certain threshold. The number of pseudo-random projections may be represented herein with $K_{rand}$.

An embodiment obtains the SVD set of projection matrices from Eigen analysis of the feature covariance matrix. The SVD projection matrices maintain cross-correlation of the projected values at zero. The SVD based projection matrices thus result in fingerprints with smaller number of average collisions than the fingerprints from pseudo-random projection matrices. The number of SVD-based projections is represented herein with $K_{svd}$, ordered in terms of the significance of their corresponding eigenvalues.

An embodiment obtains the LPP based projections from analysis of the features of the reference video (e.g., from an original or unmodified instance of the media content) and of features of the modified video in the training set that correspond to the features of the reference video. LPP-based projection matrices preserve the original local neighborhood of a feature vector in the projected space. LPP-based projection matrices thus contribute to the robustness of the generated fingerprints. However, LPP-based projection matrices may result in a larger number of collisions. The number of LPP-based projection matrices is represented herein with $K_{lpp}$, ordered in terms of the significance of their corresponding eigenvalues.

An embodiment obtains the ICA-based projection matrices from analysis of the features of a training set. The ICA-based projection matrices allow projected values that are both uncorrelated and independent. The ICA-based projection matrices may thus result in fingerprints with a minimal number of average collisions. The number of ICA-based projections is represented herein with $K_{ica}$, ordered in terms of their non-gaussanity measures.

From a number n of projected values that are computed from the F feature types, in which $n=F(K_{rand}+K_{svd}+K_{lpp}+K_{ica})$, a number $w_j$ of bits are extracted from each projected value using quantization, in which j represents a number 1, 2, . . . n.

The training dataset D includes examples of reference video content and modified video content that corresponds to the reference content, modified in one or more ways. A measure of robustness may thus be computed for each projection. For example, an embodiment counts a percentage (or other measurement) of how frequently the quantized bits of reference content match the quantized bits of corresponding modified content. Alternatively or additionally, an embodiment may compare pre-quantized projected values. Thus, an embodiment computes a robustness measure in relation to (e.g., based at least in part on) a Hamming similarity HS( ) which relates to a count of the percentage (or other rational or relative measure) of times that the quantized bits of the reference content match the quantized bits of corresponding modified content. For example, in Equation 1 below, a robustness measure $R_j$ is computed for the projection j.

$$\sum_{p=1,\ldots,N} \sum_{q \in NN(p)} U_{pq} HS(b_p^j, b_q^j) \qquad (1)$$

In Equation 1, p represents an index of the feature vectors that are extracted from the reference content, q represents neighbors that are nearest to the feature vector p (NN(p)) and corresponds to the feature vectors that are extracted from the modified content, and $b_p^j$ and $b_q^j$ represent bits that are generated by quantizing the projection j. In Equation 1, $U_{pq}$ represents a weight that is associated with the Hamming similarity between p and q. The Hamming similarity weight $U_{pq}$ may be computed in relation to a measurement or other characterization of similarities that characterize p and q, similarities that exist between p and q, and/or a relationship that characterizes the neighborhoods of p and q.

Upon defining the robustness measurement for each of the projections, an embodiment defines a measure that relates to search time (e.g., the average number of collisions). For an example index set $I \subseteq \{1, \ldots, n\}$ that shows which projections are selected, a number K of fingerprint bits per codeword may be computed according to Equation 2, below.

$$K = \sum_{j \in I} w_j \qquad (2)$$

In Equation 2, $w_j$ represents the number of bits derived after quantizing a projected value.

Where N represents the number of fingerprint codewords in the training dataset D, the K bits per fingerprint codeword may be distributed among $2^K$ buckets, e.g., hash bins. The number of samples in a bucket i is represented herein with $N_i$. As $N_i$ is effectively the number of collisions in bucket i, the probability $p_i$ of collision in bucket i is $$p_i \approx \frac{N_i}{N}.$$

A corresponding probability density function $B_I$ represents the distribution of fingerprint codewords in the available number of buckets for a given index set I.

The time that transpires in finding a match from bucket i may be given with the expression: $S_i = cN_i$, in which c represents a constant. An expected search time may thus correspond to Equation 3, below.

$$E(S) = \sum_{i=1}^{2^K} p_i S_i \approx \frac{c}{N} \sum_{i=1}^{2^K} N_i^2 = cN \sum_{i=1}^{2^K} p_i^2, \quad (3)$$

The expected search time is related to $$\sum_{i=1}^{2^K} N_i^2.$$

Thus, minimizing the expected search time is equivalent to $$\min \sum_{i=1}^{2^K} N_i^2,$$

and thus to $$\min \sum_{i=1}^{2^K} p_i^2.$$

Moreover, as $p_i^2$ and $p_i \log p_i$ are monotonically related, minimizing $$\sum_{i=1}^{2^K} p_i^2$$

is equivalent to maximizing the joint entropy given by Equation 4, below.

$$-\sum_{i=1}^{2^K} p_i \log p_i \quad (4)$$

To evaluate the search time performance of a selected set of projections $I \subseteq \{1, \ldots, n\}$, an embodiment computes the joint entropy Entropy($B_I$) from the training dataset.

Given the robustness measure $R_j$ (j=1, 2, ... n) for each of the n candidate projections, an embodiment computes the selection of an optimal subset of the projections I that satisfies Equation 5, below.

$$\max_I \lambda \text{Entropy}(B_I) + \sum_{j \in I} R_j \quad (5)$$

s.t.

$$\sum_{j \in I} w_j \le W$$

$$I \subseteq \{1, \ldots, n\}$$

In Equation 5, W represents the total number of fingerprint bits per codeword and λ represents a parameter that relates to a tradeoff or balancing between robustness and search time (e.g., average number of collisions, performance measurement, sensitivity attribute). Larger values of the tradeoff parameter λ correspond to smaller search times (reduced search latency).

Example Combinatorial Optimization Approach

An embodiment uses a contribution from each projection to compute a combinatorial optimization of fingerprint robustness and performance (e.g., search time). From a given set of items, each item having a weight and a value, the Knapsack or Rucksack problem describes how to determine the number of each item to include in a collection so that the total weight of the sack is less than a prescribed total weight limit and the total value is as maximized. In an embodiment, the n projections represent the items. The weight of the items, e.g., the n projections, is equivalent to the $w_j$ bits that are derived from each projection. The value of each item is equivalent to the degree to which each of the n projections contributes to the objective function of a weighted sum of robustness and entropy. An embodiment functions to maximize the objective function, given a fingerprint codeword size of W.

Representing the objective function A(W) as the maximum value that can be attained for a codeword size of W, then for each Y that is less than or equal to W (Y≤W), an embodiment defines A(Y) as the maximum value that can be attained with total weight less than or equal to Y.

As used herein, the expression A(j, Y) represents the maximum value that can be attained with a weight less than or equal to Y using items up to the number j. Thus, as used herein the expression A(n,W) represents the optimal solution for a fingerprint codeword 'size(weight)' that is less than or equal to W, over a number n of projections (e.g., items). An embodiment applies a dynamic programming solution, which finds the optimal solution A(n,W) with recursive computations.

An embodiment computes recursively the maximum value that can be attained with a weight less than or equal to Y using items up to the number j, A(j, Y) according to Definition 6, below.

$A(0, Y) = 0$ $A(j, 0) = 0$ $A(j, Y) = A(j-1, Y)$ if $w_j > Y$ $A(j, Y) = \max\{A(j-1, Y), p_j + A(j-1, Y-w_j)\}$ if $w_j \le Y$ \quad (6)

In Equation 6, A(j−1,Y) represents the performance of the current subgroup of selected projection matrices (items) with weight less than or equal to Y and $p_j + A(j-1, Y-w_j)$ represents the performance of the subgroup that includes the current item j. In Definition 6, $p_j$ represents the value contributed towards the objective function with the inclusion of the $j^{th}$ projection (e.g., item j). The result is evaluated. If upon its inclusion, the value of objective function rises, the $j^{th}$ item is selected and the value of objective function is updated. If the value of the objective function does not rise upon inclusion of the $j^{th}$ projection item, the item j is excluded, and the value of the objective function remains without being updated.

Alternatively or additionally, an objective function that corresponds to the performance measurement is represented herein with A(W), which comprises a maximum performance measurement that may be attained for a codeword size of W. For each Y that is less than or equal to W: $Y \leq W$, A(Y) comprises the maximum performance measurement that can be attained with total weight less than or equal to Y. A(j, Y) comprises the maximum value that may be attained with a weight that is less than or equal to Y, using items up to j. A(n,W) thus comprises the optimal performance measurement for a fingerprint codeword size less than or equal to W, using n projections. Similarly, I(j, Y) represents the chosen subset (subgroup) corresponding to A(j, Y). S(j, Y) represents a structure to store information that relates to or identifies which bucket contains those points that correspond to A(j, Y). An embodiment uses modified dynamic programming to compute A(n,W) recursively. Thus, A(j,Y) may be computed recursively according to the pseudo code in Table 1, below.

TABLE 1

```
A(0,Y) = 0, Y = 1,...,W
I(0,Y) = empty set, Y = 1,...,W
S(0,Y) = one single bucket that contains all the data, Y = 1,...,W
for j = 1:n
    for Y = 1:W
        I₁ = I(j-1, Y-wⱼ)
        S_{I₁} = S(j-1, Y-wⱼ)
        I₂ = I₁ ∪ {j}
        Given S_{I₁} and bits bⱼ in new projection j, compute the new bucket
        structure S_{I₂}
        Compute the entropy B_{I₂} based on S_{I₂}
```
$$A_{I_2} = \left( \sum_{j \in I_2} R_j + \lambda B_{I_2} \right)$$
```
        if wⱼ > Y or A(j-1,Y) >= A_{I₂}
            A(j,Y) = A(j-1,Y)
            I(j,Y) = I(j-1,Y)
            S(j,Y) = S(j-1,Y)
        else
            A(j,Y) = A_{I₂}
            I(j,Y) = I₂
            S(j,Y) = S_{I₂}
        end
    end
end
```

An embodiment thus computes a solution for the optimal solution for a fingerprint codeword 'size(weight)' that is less than or equal to W, over a number n of projections, 'A(n, W)' using recursion. The recursive process computes a global optimum if the value contributed towards the objective function with the inclusion of the $j^{th}$ projection '$p_j$' is determined exclusively by item j. In an embodiment, the value of the objective function is computed in two parts. First, the robustness characteristic $R_j$ is computed for the projection item j, according to Equation 1, above as follows.

$$\sum_{p=1,\ldots,N} \sum_{q \in NN(p)} U_{pq} HS(b_p^j, b_q^j) \quad (1, \text{e.g., as above})$$

The robustness component of the objective function depends exclusively on the projection item j. Second, an embodiment computes the joint entropy.

The joint entropy, however, is not determined exclusively by the choice of projection item j. Rather, the joint entropy computation also depends on other projections, which have been already selected. Thus, the modified dynamic programming approach of the present embodiment identifies a locally optimal solution. However, the modified dynamic programming may not provide a globally optimal solution.

Example Optimal Projection Matrices Design Approach

Using a contribution from each projection to compute a combinatorial optimization of fingerprint robustness and search time, as in the embodiment described immediately above, achieves a tradeoff between robustness and search time with the use of multiple types of projections and features. The embodiment described immediately above, which uses the combinatorial approach, functions to select the optimal projections from a given set of candidate projections using a training set. An additional (or alternative) embodiment functions for designing or computing a new type of projection from (e.g., based on) a feature of the underlying media content. Projection matrices that are based on the underlying media content features may differ, perhaps significantly, from projection matrices obtained through SVD, LPP or ICA, or from the pseudo-random projections, which are described above.

An embodiment functions to design or compute an optimal set of projection matrices based, at least in part, on two objectives. First, the optimal projection matrices function to preserve the original local neighborhood of a feature vector over the projected space, which improves the robustness property. Preserving the original local neighborhood of a feature vector over the projected space allows projected values of the feature matrix (Q1) that are extracted from the modified content instance, which are in the neighborhood of the reference feature matrix (Q), to remain or loiter in the local neighborhood of the reference projected values in the projected space. Second, the optimal projection matrices function to create independent values in the projected space, which improves the search time performance measurement (e.g., sensitivity property). Creating independent values in the projected space minimizes mutual information between the projected values, which maximizes the joint entropy and allows search latency to be reduced. For example, computing $$\left( \sum_{i=1}^{2^K} p_i \log p_i \right) = \left( \sum_{i=1}^{2^K} \frac{N_i}{N} \log\left(\frac{N_i}{N}\right) \right)$$

achieve the minimum, when projections T are found in which $z_k = T_k^t x$ are independent, and thresholds $b_k = F_{z_k}^{-1}(0.5)$ are selected, in which $F_{z_k}$ comprises the cumulative distribution function (c.d.f.) of $z_k$.

For example, an embodiment may function with a database that stores and indexes a number N of fingerprint codewords. As described above, with a number K of bits per fingerprint codeword, the database has a total of $2^K$ buckets (hash bins). The number of samples in a bucket i is represented herein with $N_i$. As $N_i$ is effectively the number of collisions in bucket i, the probability $p_i$ of collision in bucket i is $$p_i \approx \frac{N_i}{N}.$$

As described above, the time that transpires in finding a match from bucket i may be given with the expression:

$S_i = cN_i$, in which c represents a constant. An expected search time may thus, as above, correspond to the solution of Equation 3.

$$E(S) = \sum_{i=1}^{2^K} p_i S_i \approx \frac{c}{N} \sum_{i=1}^{2^K} N_i^2 = cN \sum_{i=1}^{2^K} p_i^2, \quad (3, \text{e.g., as above})$$

As described above, the expected search time is related to $$\sum_{i=1}^{2^K} N_i^2.$$

Thus, minimizing the expected search time is again equivalent to $$\min \sum_{i=1}^{2^K} N_i^2,$$

and thus again to $$\min \sum_{i=1}^{2^K} p_i^2.$$

As described above moreover, $p_i^2$ and $p_i \log p_i$ are monotonically related. Thus as above, minimizing $$\sum_{i=1}^{2^K} p_i^2$$

is again equivalent to maximizing the joint entropy given by Equation 4.

$$-\sum_{i=1}^{2^K} p_i \log p_i \quad (4, \text{e.g., as above})$$

To evaluate the search time performance of a selected set of projections $I \subseteq \{1, \ldots, n\}$, an embodiment (similar, additional or alternative in relation to an embodiment described above), computes the joint entropy Entropy($B_I$) from the training dataset.

An embodiment thus uses the optimal projections to create projected values that are independent in the projected space, which improves the search time and concomitantly, the uniqueness characteristic or property of the fingerprint.

An embodiment thus finds optimal projections based on the preservation of the original local neighborhood of a feature vector over the projected space, which improves the robustness property, and on the creation of independent values in the projected space, which improves the search time performance measurement (sensitivity property) and thus reduces search latency.

For example, an embodiment computes a feature matrix $X_{d \times N}$ from an offline training dataset, which comprises features that are extracted from a set of reference and modified content. The feature matrix $X_{d \times N}$ has a dimension of feature, which is represented herein with the number d, and a number N, which corresponds to the number or data population of the training dataset. The $p^{th}$ column of the matrix $X_{d \times N}$ is represented herein with $X_p$, which represents the feature vector for $p^{th}$ column data. An embodiment functions to assume that the $X_p$ data samples include independent and identically-distributed random variables (i.i.d. sampled) from a random vector denoted herein with x. The random vector x has a mean of 0 and identity covariance matrix: $E(x) = 0$ and $E(xx^t) = I$. To promote the i.i.d. sampling assumption, an embodiment may be implemented with preprocessing. For example, a video implementation may apply centering and/or whitening preprocessing to the data to promote the i.i.d. sampling assumption.

An embodiment obtains information in relation to the neighborhood of each data point p of the training dataset. For example, an embodiment is implemented in which the neighborhood of each data point is specified to include feature points that essentially comprise modified versions of the data point p. The set of nearest neighbor data points of data point p is represented herein with NN(p), which has a nearest neighbor data point q: $q \in NN(p)$. A measure of the similarity between each data point p of the training dataset and the set of its nearest neighbor data points NN(p) is represented herein with $W_{pq}$.

An embodiment computes a set of K projection matrices $T = \{T_1, T_2, \ldots T_K\}$ that satisfy the conditions in Equation 7, below.

$$\min_T I(T_1^t x, \ldots, T_k^t x, \ldots, T_K^t x) \quad (7A)$$

$$\sum_{p=1,\ldots,N} \sum_{q \in NN(p)} W_{pq} \|T^t X_p - T^t X_q\|^2 \leq \eta$$

$$Y_p = \text{sign}(T^t X_p - b) \text{ for } k = 1, \ldots, K, p = 1, \ldots, N$$

In Equation 7A, the expression $I(T_1^t x, \ldots, T_k^t x, \ldots, T_K^t x)$ relates to the mutual information between the projected values, the expression $$\sum_{p=1,\ldots,N} \sum_{q \in NN(p)} W_{pq} \|T^t X_p - T^t X_q\|^2 \leq \eta$$

represents a neighborhood preserving property that relates to the set of projection matrices T, and $Y_p$ represents the fingerprint codeword that may be obtained, upon the projection of the $p^{th}$ column of the $X_{d \times N}$ matrix $X_p$ onto the projection matrix T and thresholding. Similarly, additionally or alternatively, an embodiment computes projection matrices that satisfy the condition of Equation 7B, below.

$$\min_{T,b} I \sum_{p=1,\ldots,N} \sum_{q \in NN(p)} W_{pq} \|Y_p - Y_q\|_H \quad (7B)$$

s.t.

$$I(T_1^t x, \ldots, T_k^t x, \ldots, T_K^t x) = 0$$

$$Y_p = \text{sign}(T^t X_p - b) \text{ for } k = 1, \ldots, K, p = 1, \ldots, N$$

An embodiment functions with an assumption that the data x is from Gaussian distribution, and thus, that the expression $z=T^t x$ also follows Gaussian distribution. The independence among $z_k = T_k^t x$, e.g., $I(T_1^t x, \ldots, T_k^t x, \ldots, T_K^t x) = 0$, is essentially equal to the degree of uncorrelated-ness among $z_k = T_k^t x$. The degree of uncorrelated-ness may be expressed as $$\frac{1}{N} \sum_{p=1}^{N} Z_p Z_p^t = I_d$$

with the samples $\{Z_p = T_k^t X_p, p=1, \ldots, N\}$. In this expression of the degree of uncorrelated-ness, $I_d$ represents an identity matrix with dimensions of d by d. Thus, an embodiment may use an eigenvector related approach, which may be applied over data aggregates over a large scale, to compute projection matrices, e.g., as in Equation 7C, below.

$$\min_{T,b} \sum_{p=1,\ldots,N} \sum_{q \in NN(p)} W_{pq} \|Z_p - Z_q\|^2 \qquad (7C)$$

s.t.

$$\sum_{p=1}^{N} Z_p = 0,$$

$$\frac{1}{N} \sum_{p=1}^{N} Z_p Z_p^t = I_d,$$

$$Z_p = T^t X_p$$

Example ICA Related Embodiment

An embodiment uses independent component analysis (ICA) to compute an optimal set of projection matrices that minimize the mutual information between the projected values as in Equation 7A above, without the robustness condition. With a non-Gaussian data distribution, ICA may be used to identify a set of K projections that minimize the mutual information between the projected values according to one or more Equation 7A without the robustness condition. Where $z_k = T_k^t x$ is uncorrelated and has unit variance, an embodiment computes mutual information according the Equation 7D, below.

$$I(z_1, \ldots, z_k, \ldots, z_K) = C - \sum_{k=1}^{K} J(z_k) \qquad (7D)$$

In Equation 7D, C represents a constant, and $J(z_k)$ represents the negentropy, which is defined according to Equation 8, below.

$$J(z_k) = H(v) - H(z_k) \qquad (8)$$

In Equation 8, v represents a Gaussian random variable that has a variance equal to that of $z_k$, and $H(\,)$ represents entropy. Negentropy $J(z_k)$ takes non-negative values, e.g., because Gaussian distributions have a maximum entropy among all distributions that have the same variance. Thus, the negentropy $J(z_k)$ has a value of zero (0) when $z_k$ are also a Gaussian random variable.

An embodiment approximates negentropy according to Equation 9, below.

$$J(z_k) = H(v) - H(z_k) \approx \|E(G(v)) - E(G(z_k))\|^2 \qquad (9)$$

In Equation 9, $E(\,)$ represents the expectation, and $G(\,)$ represents one or more non-quadratic functions. For example, the non-quadratic functions may include, among others, $$G(u) = \frac{1}{a} \log \cosh au,$$

and/or $G(u) = -e^{-u^2/2}$. Thus, an embodiment may function to compute the optimal set of projection matrices that minimize the mutual information between the projected values according to Equation 10, below.

$$\min_{T_k} \left( C - \sum_{k=1}^{K} \|E(G(v)) - E(G(v)) - E(G(T_k^t x))\|^2 \right) \qquad (10)$$

s.t., $$\sum_{p=1,\ldots,N} \sum_{q \in NN(p)} \sum_{k=1}^{K} W_{pq} \|T_k^t X_p - T_k^t X_q\|^2 \leq \eta$$

$$E\{(T_k^t x)(T_j^t x)\} = \delta_{kj}$$

In Equation 10, $\delta_{kj}=1$, if $k=j$; and $\delta_{kj}=0$, if $k \neq j$. The random vector x has a unity identity covariance matrix: $E(xx^t)=I$. Thus, computations may execute according to the condition: $E\{(T_k^t x)(T_j^t x)\} = \delta_{kj} \Rightarrow E\{T_k^t xx^t T_j\} = T_k^t E\{xx^t\} T_j = \delta_{kj} \Rightarrow T_k^t T_j = \delta_{kj}$.

Moreover, an embodiment may thus compute the robustness condition according to Equation 11, below.

$$\sum_{p=1,\ldots,N} \sum_{q \in NN(p)} \sum_{k=1}^{K} W_{pq} \|T_k^t X_p - T_k^t X_q\|^2 = \sum_{k=1}^{K} T_k^t XLX^t T_k \qquad (11)$$

In Equation 11, L represents a Laplacian matrix $L=D-W$, and D represents a diagonal matrix, $$D_{p,p} = \sum_{q=1}^{N} W_{p,q}.$$

The mutual information condition allows an embodiment to compute the optimal solutions as other than LPPs.

For an objective function that comprises a Laplacian feature matrix: $A=XLX^t$, an embodiment may simplify the computation of Equation 11 according to Equations 12, below.

$$\max_{T_k, k=1 \ldots K} \sum_{k=1}^{K} \|g_0 - E(G(T_k^t x))\|^2 \qquad (12)$$

s.t., $$\sum_{k=1}^{K} T_k^t A T_k \leq \eta$$

$$T_k^t T_j = \delta_{kj}, 1 \leq k, j \leq K$$

In Equation 12, the parameter $\eta$ controls the tradeoff between the search time and search accuracy. For example, when the search time/accuracy tradeoff parameter $\eta$ is infinite: $\eta=\infty$, an embodiment computes ICA related solutions, which have the best (e.g., shortest, briefest) search time. However, where the search time/accuracy tradeoff parameter η is equal to η=η₀, in which $$\eta_0 = \sum_{k=1}^{K} T_k^t A T_k$$

for those projection matrices $T_k$ that are obtained by LPPs, an embodiment computes LPP related solutions, which tend to have particularly strong robustness.

In Equation (12), the expression $\|g_0-f\|^2$ takes a maximal value upon the maximizing or minimizing the value f. Thus, an embodiment may compute two robustness optimizations based on Equation 12, which are represented with Equation 13 and Equation 14, below. In Equation 13, the robustness is maximized. In Equation 14, robustness is minimized (e.g., in relation to a minimized search time target).

$$\max_{T_k, k=1...K} E(G(T_k^t x)) \quad (13)$$
s.t.,
$$\sum_{k=1}^{K} T_k^t A T_k \leq \eta$$
$$T_k^t T_j = \delta_{kj}, 1 \leq k, j \leq K$$
or
$$\min_{T_k, k=1...K} E(G(T_k^t x)) \quad (14)$$
s.t.,
$$\sum_{k=1}^{K} T_k^t A T_k \leq \eta$$
$$T_k^t T_j = \delta_{kj}, 1 \leq k, j \leq K$$

An embodiment uses ICA in an optimization approach that considers a Karush-Kuhn-Tucker (KKT) condition related to computing a maximizing robustness, as in Equation 13. For example, the KKT condition of Equation 13 is represented herein with Equation 15, below.

$$F(w)=E(xg(w^t x))-\gamma Aw-\beta w=0, \gamma \geq 0 \quad (15)$$

The KKT condition of Equation 14 is represented herein with Equation 16, below.

$$F(w)=E(xg(w^t x))-\gamma Aw-\beta w=0, \gamma \leq 0 \quad (16)$$

An embodiment computes a combined result with Equation 15 and Equation 16, according to Equation 17, below.

$$F(w)=E(xg(w^t x))-\gamma Aw-\beta w=0 \Rightarrow E(w^t xg(w^t x))-\gamma w^t Aw-\beta w^t w=0 \Rightarrow \beta=E(w^t xg(w^t x))-\gamma w^t Aw \quad (17)$$

A Jacobian function for F(w) may be computed according to Equation 18, below.

$$JF(w)=E(xx^t g'(w^t x))-\gamma A-\beta I \approx E(g'(w^t x))I-\gamma A-\beta I \quad (18)$$

Thus, an ICA related embodiment optimizes projection vector selection based on fixed point iteration. An embodiment may also use a Newton approximation based optimization. An example Newton approximation based optimization process is described according to the pseudo code shown in Table 2, below.

TABLE 2

For k = 1...K
  1) Random intialize w.
  2) $w^+ = w - [E(g'(w^t x))I - \beta I - \gamma A]^{-1}[E(xg(w^t x)) - \beta w - \gamma Aw]$.
    Here γ is a parameter chosen by users. $\beta = E(w^t xg(w^t x)) - \gamma w^t Aw$.
  3) $w = w^+/\|w^+\|$.
  4) Repeat step 2 and 3 until converge.

5) if k = 1, $\tilde{w} = w$; if k > 1, $\tilde{w} = w - \sum_{j=1}^{k-1} (w^t T_j) T_j$.

6) $T_k = \tilde{w}/\|\tilde{w}\|$.
end

A fixed point based or Newton approximation based embodiment may thus compute an ISA related optimization without the parameter α or the tradeoff parameter η. In an embodiment, the parameter γ effectively represents α, or equivalently, the tradeoff parameter η. In thus computing the ISA related optimization according to the fixed point based or Newton approximation based process, the parameter γ taking a zero value: γ=0 is equivalent to the parameter a taking a zero value: α=0, and the tradeoff parameter η going infinite: η=∞. Concomitantly, the parameter γ going infinite: γ=∞ is equivalent to the parameter a going infinite: α=∞, and the tradeoff parameter η=η₀. Moreover, when γ=0, the optimization is computed as with Equation 12, above. Computing optimization as with Equation 12, an embodiment obtains an ICA related solution: $w^+=w-[E(xg(w^t x))-\beta w]/(E(g'(w^t x))-\beta)$. When the parameter γ goes infinite: γ=∞, an embodiment obtains LPP related solutions. An embodiment may compute the expectation $E(g'(w^t x))$ and $E(xg(w^t x))$. However, with $\{X_p, p=1, \ldots, N\}$ as i.i.d. samples of x, an embodiment computes the averages:

$$\frac{1}{N}\sum_p^N (g'(w^t X_p)) \text{ and } \frac{1}{N}\sum_p^N (X_p g(w^t X_p)),$$

respectively.

In an embodiment wherein data remains un-whitened, the identity covariance matrix $E(xx^t)=\Sigma=EDE^t$, wherein $EDE^t$ represents a decomposition of Σ. D represents a diagonal matrix, and E represents an orthogonal matrix. An embodiment denotes $$Q = ED^{-\frac{1}{2}}E^t.$$

Thus, whitening may be computed according to the expression: $\bar{x}=Qx$. Effectively therefore, $$E(\bar{x}\bar{x}^t) = E(Qxx^t Q^t) = ED^{-\frac{1}{2}}E^t EDE^t ED^{-\frac{1}{2}}E^t = I.$$

In an embodiment, LPP is thus computed over the original space of x, and ICA is computed over the transformed space of $\bar{x}$. As $T_k^t x=T_k^t \bar{x}=T_k^t Qx$, $T_k^t=T_k^t Q$, and $T_k=Q^t T_k$. With data that remains un-whitened therefore, an embodiment computes Equation 19, below.

$$\max_{T_k, k=1 \ldots K} \sum_{k=1}^{K} \|g_0 - E(G(\overline{T}_k^t \overline{x}))\|^2 \quad (19)$$

s.t., $$\sum_{k=1}^{K} T_k^t A T_k \leq \eta$$

$$E\{(\overline{T}_k^t \overline{x})(\overline{T}_j^t \overline{x})\} = \delta_{kj}$$

An embodiment may compute Equation 19 according to Equation 20, below, in which $\overline{A} = QAQ^t$.

$$\max_{T_k, k=1 \ldots K} \sum_{k=1}^{K} \|g_0 - E(G(\overline{T}_k^t \overline{x}))\|^2 \quad (20)$$

s.t., $$\sum_{k=1}^{K} \overline{T}_k^t \overline{A} \overline{T}_k \leq \eta$$

$$\overline{T}_k^t \overline{T}_j = \delta_{kj}$$

Example Computer System Implementation Platform

Embodiments of the present invention may be implemented with a computer system, systems configured in electronic circuitry and components, an integrated circuit (IC) device such as a microcontroller, a field programmable gate array (FPGA), or an application specific IC (ASIC), and/or apparatus that includes one or more of such systems, devices or components.

FIG. 2A depicts an example computer system platform 200, with which an embodiment of the present invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. Processor 204 may perform one or more digital signal processing (DSP) functions. Additionally or alternatively, DSP functions may be performed by another processor or entity (represented herein with processor 204).

Computer system 200 may be coupled via bus 202 to a display 212, such as a liquid crystal display (LCD), cathode ray tube (CRT), plasma display or the like, for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Embodiments of the invention relate to the use of computer system 200 for projection based hashing that balances robustness and sensitivity of media fingerprints. According to an embodiment of the invention, projection based hashing that balances robustness and sensitivity of media fingerprints is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The terms "computer-readable medium" and/or "computer-readable storage medium" as used herein may refer to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and other conductors and fiber optics, including the wires that comprise bus 202. Transmission media can also take the form of acoustic or electromagnetic (e.g., light) waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a digital subscriber line (DSL), cable or other modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for implementing media fingerprints that reliably conform to media content, as described herein.

The received code may be executed by processor 204 as it is received, and/or stored in storage device 210, or other non-volatile storage for later execution. In this manner, computer system 200 may obtain application code in the form of a carrier wave.

Example IC Platform

Figure 2B:
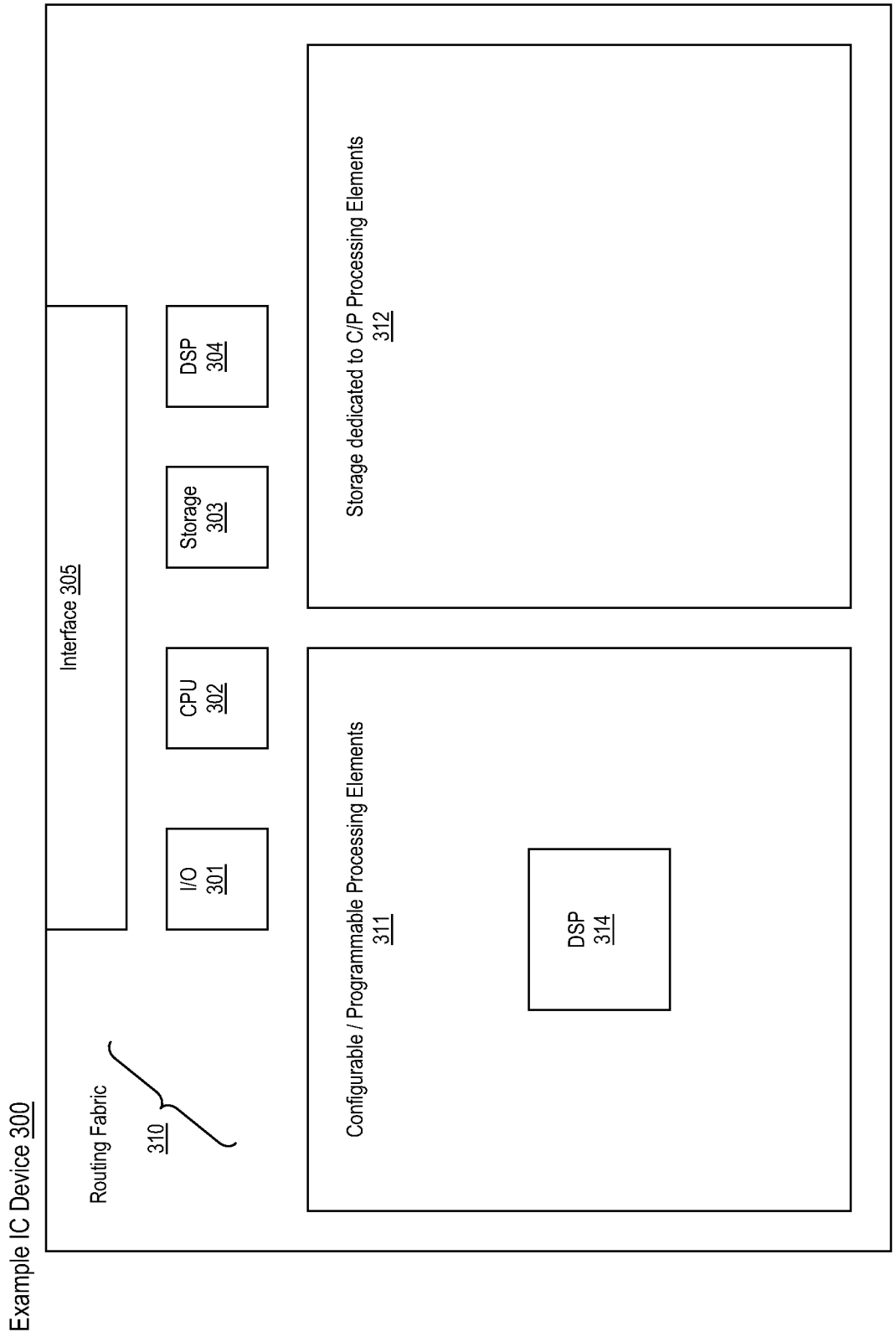

FIG. 2B depicts an example IC device 300, with which an embodiment of the present invention may be implemented, e.g., for projection based hashing that balances robustness and sensitivity of media fingerprints. IC device 300 may have an input/output (I/O) feature 301. I/O feature 301 receives input signals and routes them via routing fabric 310 to a central processing unit (CPU) 302, which functions with storage 303. I/O feature 301 also receives output signals from other component features of IC device 300 and may control a part of the signal flow over routing fabric 310. A digital signal processing (DSP) feature performs at least function relating to digital signal processing. An interface 305 accesses external signals and routes them to I/O feature 301, and allows IC device 300 to export signals. Routing fabric 310 routes signals and power between the various component features of IC device 300.

Configurable and/or programmable processing elements (CPPE) 311, such as arrays of logic gates may perform dedicated functions of IC device 300, which in an embodiment may relate to extracting and processing media fingerprints that reliably conform to media content. Storage 312 dedicates sufficient memory cells for CPPE 311 to function efficiently. CPPE may include one or more dedicated DSP features 314.

Example Embodiments

Thus, an embodiment of the present invention may relate to one or more of the examples that are enumerated below.

1. A method, comprising:

identifying a plurality of candidate features that are components of one or more of audio or video content and a plurality of candidate projection matrices, wherein each of the candidate projection matrices comprise an array of coefficients that relate to the candidate features;

selecting a subgroup of the projection matrices, based at least in part on an optimized combination of at least two characteristics of the candidate features or the projection matrices; and deriving fingerprints that uniquely identify the audio or video content from the selected optimized projection matrices subgroup.

2. The method as recited in Enumerated Example Embodiment 1 wherein the selection of the subgroup of the projection matrices based, at least in part, on the optimized combination of characteristics thereof comprises dynamic programming.

3. The method as recited in Enumerated Example Embodiment 1 wherein the candidate video features comprise one or more of moment invariants, intensity histograms, color histograms, edge orientation features, or motion vectors.

4. The method as recited in Enumerated Example Embodiment 1 wherein the candidate audio features comprise one or more of:

spectrograms;

chromagrams;

mel frequency cepstral coefficients (MFCC);

one or more of modified discrete cosine transform (MDCT), discrete cosine transform (DCT), fast Fourier transform (FFT) or short time Fourier transform (STFT) coefficients;

one or more of complex quadrature minor filter (CQMF) or wavelet coefficients; or one or more time domain related features.

5. The method as recited in Enumerated Example Embodiment 1 wherein the selection of the subgroup of the candidate features or the projection matrices based at least in part on the optimized combination of characteristics thereof comprises computing a performance measurement for each of at least two subgroups of the plurality of candidate features or the projection matrices wherein the performance measurement is based, at least in part, on a sensitivity value and a robustness value associated with each of the at least two subgroups, and a parameter related to one or more of a cost/benefit balancing or a trade off between the sensitivity value and a robustness value;

comparing the performance measurements of the at least two feature subgroups or the projection matrices; and based on the comparison, identifying a performance measurement that corresponds to one of the at least two feature subgroups or the projection matrices as an optimal performance measurement;

wherein one feature subgroup is selected from among the at least two feature subgroups or the projection matrices based, at least in part, on the identification of the optimal performance measurement.

6. The method as recited in Enumerated Example Embodiment 5 wherein:

a population of the plurality of candidate projection matrices comprises a number N;

the optimal subgroup is populated by a number W of the N projection matrices;

the number N is greater than the number W; and the selecting step comprises, upon the selection of a most optimal feature subgroup from among the N candidate features or the projection matrices, recursively performing the selecting step, wherein a subsequent next most optimal, in relation to the most optimal, subgroup is selected from among the remaining candidate features or the projection matrices.

7. The method as recited in Enumerated Example Embodiment 6 wherein the selecting step further comprises continuing the recursive repetition over subsequently remaining candidate features or the projection matrices until the W optimal subgroups are all identified or selected.

8. The method as recited in Enumerated Example Embodiment 6 wherein the recursive repetition comprises:

a) computing a first subgroup performance measurement for a current subgroup of the projection matrices based, at least in part, on a robustness value and a sensitivity value of the current candidate subgroup;

b) computing a subgroup performance measurement for a candidate subgroup, which is subsequent to the first candidate subgroup, from the remaining projection matrices based, at least in part, on the robustness value and the sensitivity value of the subsequent candidate subgroup;

c) combining each of the candidate projection matrices that remain after the first current candidate projection matrix subgroup performance measurement computation with the original current subgroup, wherein new candidate projection matrix subgroups, each subsequent in relation to the original candidate features or the projection matrices subgroup and each uniquely corresponding to one and only one of each of the remaining candidate projection matrices, is formed; and d) computing a subgroup performance measurement for each of the new candidate projection subgroups, based, at least in part, on the robustness value and the sensitivity value of the subsequent candidate subgroup.

9. The method as recited in Enumerated Example Embodiment 8 wherein the recursive repetition comprises:

e) comparing each of the new subgroup performance measurements with the current or original subgroup of the candidate features or the projection matrices and each other of the new subgroup performance measurements;

wherein it is determined whether one of the new computed subgroup performance measurements exceeds or is more optimal than the current or original subgroup of the candidate features or the projection matrices or each of the other new computed subgroup performance measurements.

10. The method as recited in Enumerated Example Embodiment 9 wherein the recursive repetition further comprises:

f) upon the comparison determining that one of the new subgroup performance measurements exceeds or is more optimal than the current or original subgroup of the or each of the other new computed subgroup performance measurements, updating the current or original candidate subgroup, wherein the new subgroup, which is determined to have the performance measurement that exceeds or is more optimal than the current or original subgroup, is added thereto to comprise an updated current optimized subgroup.

11. The method as recited in Enumerated Example Embodiment 9 wherein the recursive repetition further comprises:

g) upon the comparison, further determining whether W items remain in the optimal subgroup.

12. The method as recited in Enumerated Example Embodiment 11 wherein the recursive repetition further comprises:

h) upon the further determination that less than W projection matrices remain in the optimal subgroup, adding one additional candidate projection matrix, to the most optimal subgroup, wherein a newly updated current optimal subgroup of candidate projection matrices s formed; and i) repeating steps a) through g) over the newly updated current optimal projection matrices subgroup.

13. The method as recited in Enumerated Example Embodiment 5 wherein the performance measurement computation for each of at least two subgroups of the plurality of candidate features comprises:

deriving a first fingerprint codeword based on a subgroup of features in an original instance of media content;

deriving one or more additional fingerprint codewords based on a subgroup of features in a content instance that comprises a modification of the original media content; and for each of the one or more additional fingerprint codewords derived from the modified content instance, computing a difference between each of the one or more additional codewords, wherein a set of corresponding difference values is generated, wherein the corresponding difference values, wherein the difference values relate to a Hamming similarity between the first fingerprint codeword and the one or more additional codewords;

wherein the robustness value is based, at least in part, on the computed difference values.

14. The method as recited in Enumerated Example Embodiment 5 wherein the performance measurement computation for each of at least two subgroups of the plurality of candidate features or the projection matrices wherein the performance measurement is based, at least in part, on a sensitivity value and a robustness value associated with each of the at least two subgroups further comprises:

deriving a first set of projected values that correspond to the original media content instance based on the subgroup of features in the original instance of media content and the projection matrices;

deriving a second set of projected values that correspond to the modified media content instance based on the subgroup of features in the modified instance of media content and the projection matrices;

computing a difference between one or more of:
the features in the original media content instance and the features in the modified media content instance; or
the first set of original media content instance projected values and the second set of modified media content instance projected values;

wherein the robustness is determined based on the computed difference.

15. The method as recited in Enumerated Example Embodiment 5, further comprising computing the sensitivity value of the optimal subgroup;

wherein the computation of the optimal subgroup sensitivity comprises:

for each image of a plurality of images, or for each audio content portion of a plurality of audio content portions, which respectively comprise the video or audio content, deriving a plurality of fingerprint codewords, each codeword comprising a number n of bits, based on the optimal subgroup of image or audio content portion features;

analyzing a distribution of the codewords over a set of possible codewords that each comprise n bits; and determining the sensitivity value based on a minimal distribution of the codewords over the set of possible n-bit codewords.

16. The method as recited in Enumerated Example Embodiment 1, further comprising:

identifying a plurality of candidate projection matrices that relate to values, which correspond to one or more features that comprise components of underlying media content;

selecting an optimal subgroup of projection matrices from the plurality of candidate projection matrices;

wherein the selection of the optimal subgroup of the projection matrices is based, at least in part, on the optimized combination of characteristics thereof comprises dynamic programming; and deriving fingerprints based on the selected optimal projection matrices.

17. The method as recited in Enumerated Example Embodiment 16, wherein the selected optimal subgroup of projection matrices, comprises at least two matrices that are computed with at least two distinct basis decompositions.
18. The method as recited in claim 17 wherein the at least two basis decompositions compute one or more of pseudorandom matrices, singular value decomposition (SVD) matrices, locality preserving projection (LPP) matrices or independent component analysis (ICA) matrices.
19. The method as recited in Enumerated Example Embodiment 16, wherein the selecting step comprises:
 computing a performance measurement for each subgroup of at least two subgroups of the plurality of candidate projection matrices;
 wherein the performance measurement is based, at least in part, on:
  a sensitivity value associated with each of the subgroups;
  a robustness value associated with each of the subgroups; and
  a parameter that relates to a balance of, or a trade-off between the sensitivity value and the robustness value;
 identifying an optimal performance measurement for at least one of the subgroups; and
 selecting the identified optimally performing subgroup for the plurality of projection matrices.
20. The method as recited in claim 19 wherein the sensitivity value that is associated with the subgroups is determined based, at least in part, on measurements performed over an off-line training set wherein the off-line training set comprises one or more example instances of the underlying media content.
21. The method as recited in Enumerated Example Embodiment 20 wherein the determination of the sensitivity value comprises computing one or more of:
 a joint entropy for a set of derived bits; or
 one or more data that comprises mutual information that characterizes one or more features of the underlying media content.
22. The method as recited in claim 20 wherein the robustness value associated with that subgroup is measured using components of the underlying media content that comprises the off-line training set.
23. The method as recited in Enumerated Example Embodiment 19, wherein the selecting step comprises:
 computing a first performance measurement that is based, at least in part, on:
  a first of the sensitivity value; and
  a first robustness value;
 wherein the sensitivity value, and the robustness value, each relate to a first subgroup of the plurality of candidate projection matrices;
 computing a second performance measurement that is based, at least in part, on:
  a second sensitivity value; and
  a robustness value;
 wherein the sensitivity value, and the robustness value, each relate to a second subgroup of the candidate projection matrices;
 wherein the second subgroup of projection matrices comprises the first subgroup of projection matrices and at least one additional projection matrix;
 identifying which of the first or the second subgroup has an optimal performance measurement in relation to the other; and
 selecting the identified optimally performing subgroup for the plurality of projection matrices.
24. The method as recited in Enumerated Example Embodiment 19, wherein the selecting step comprises:
 repeating the selection of the optimal subgroup of projection matrices recursively until a number W of optimal candidate projection matrices subgroups are selected from a total number N of candidate projection matrices, wherein W is less than N.
25. The method as recited in Enumerated Example Embodiment 24, wherein the repeated recursive selection of the identified optimal subgroup of projection matrices comprises:
 computing a current performance measurement based, at least in part, on the robustness value and the sensitivity value that relate to a currently selected identified optimal subgroup of candidate projection matrices;
 adding a subsequent candidate matrix to the currently selected subgroup of candidate projection matrices, wherein a new candidate subgroup is thus formed;
 computing a robustness and sensitivity related performance measurement for the new candidate subgroup;
 comparing the performance measurement computed for the new candidate subgroup and the performance measurement of the currently selected identified optimal subgroup; and
 based on the comparison, wherein the performance measurement computed for the new candidate subgroup exceeds the performance measurement of the currently selected identified optimal subgroup, updating the currently identified optimal selected subgroup to comprise the addition of the new candidate subgroup.
26. The method as recited in Enumerated Example Embodiment 25, further comprising:
 based on the comparison, wherein the performance measurement of the currently selected subgroup exceeds the performance measurement computed for the new candidate subgroup, maintaining the currently selected subgroup as the currently selected optimal subgroup of projection matrices wherein the maintained subgroup comprises the current performance measurement, which was computed prior to the addition that formed the new candidate subgroup.
27. The method as recited in Enumerated Example Embodiment 24, wherein the repeated recursive selection of the optimal subgroup of projection matrices until the W of optimal candidate projection matrices subgroups are all selected from the total N candidate projection matrices comprises:
 a) computing a first performance measurement for a current subgroup of candidate projection matrices which, based at least on a robustness value and a sensitivity value associated with the current subgroup, comprises a first current computed candidate optimal subgroup of the W candidate projection matrices;
 b) combining each of the candidate projection matrices that remain after the first performance measurement computation, with the first current computed candidate optimal subgroup, wherein new candidate optimal subgroups of projection matrices are formed, each of them subsequent in relation to the first current computed optimal projection matrix and each uniquely corresponding to one and only one of each of the remaining subgroups of candidate projection matrices; and
 c) computing a new performance measurement for each of the new candidate optimal projection matrix subgroups based at least on a robustness value and a sensitivity value that are associated with each thereof;
 d) comparing each of the computed new projection matrix subgroup performance measurements that are computed with:

the first current computed candidate optimal subgroup; and
with each other of the new subgroup performance measurements;
wherein it is determined whether one of the one of the new subgroup performance measurements exceeds or is more optimal than the performance measurement of the first current computed candidate optimal subgroup or the other of the new subgroup performance measurements.

28. The method as recited in Enumerated Example Embodiment 27, wherein the repeated recursive selection of the optimal subgroup of projection matrices until the W of optimal candidate projection matrices subgroups are all selected from the total N candidate projection matrices further comprises:

e) upon the comparison determining that one of the new candidate projection matrix subgroup performance measurements has a performance measurement that exceeds or is more optimal than the first current computed candidate optimal subgroup or the other of the new subgroup performance measurements, updating the current computed candidate optimal subgroup, wherein the new subgroup is added to the first current computed candidate optimal subgroup to comprise an updated, new or subsequent current computed candidate optimal subgroup.

29. The method as recited in Enumerated Example Embodiment 28, wherein the repeated recursive selection of the optimal subgroup of projection matrices until the W of optimal candidate projection matrices subgroups are all selected from the total N candidate projection matrices further comprises:

f) upon the upon the comparison, further determining whether W candidate projection matrices remain in the current optimal subgroup.

30. The method as recited in Enumerated Example Embodiment 29 wherein:

g) upon the further determination that less than W (<W) candidate projection matrices remain in the current optimal subgroup, adding one additional candidate projection matrix of the <W candidate projection matrices to the current optimal subgroup to form a newly updated current optimal projection matrix subgroup; and h) repeating the steps a) through f) over the newly updated current optimal projection matrix subgroup.

31. The method as recited in Enumerated Example Embodiment 19, further comprising determining the robustness value associated with the optimal subgroup, wherein the robustness determination comprises:

computing a first set of projected values based on projecting one or more feature matrices, which are computed from an original instance of the underlying media content, onto a current optimal subgroup of projection matrices wherein a first set of projected values are computed based on the projection;

deriving one or more fingerprint codewords based on the first set of projected values;

computing a second set of projected values, which are computed with a projection of one or more feature matrices, which are computed from an instance of the media content that has been modified in relation to the original content instance, onto the current;

deriving one or more fingerprint codewords based on the second set of projection values;

comparing the one or more fingerprint codewords or the projected values that are based on the first set of projected values with the one or more fingerprint codewords or the projected values that are based on the second set of projected values; and computing one or more difference values between the one or more fingerprint codewords or the projected values that are based on the first set of projected values and the one or more fingerprint codewords or the projected values that are based on the second set of projected values, wherein the robustness value is based on the computed difference values.

32. The method as recited in Enumerated Example Embodiment 19, further comprising determining the sensitivity value associated with the optimal subgroup, wherein the sensitivity determination comprises:

for each original content instance of a plurality of original content instances, computing one or more feature matrices based on each of the original content instances;

computing a projection of the one or more feature matrices onto the identified optimal subgroup of projection matrices to obtain a plurality of projection values for each of the original content instances;

quantizing the plurality of projection values for each original content instance, wherein a plurality of fingerprint codewords, which are each uniquely associated with one and only one the plurality of original content instances, wherein each fingerprint codeword of the plurality of fingerprint codewords comprises a number 'n' of binary information quanta (bits);

computing a distribution of the plurality of fingerprint codewords over a set of possible fingerprint codewords that comprise the n bits, wherein the sensitivity value is based, at least in part, on the distribution of the plurality of fingerprint codewords over a set of possible n-bit fingerprint codewords.

33. A method comprising:

extracting a plurality of N features from media content that comprises one or more of audio or video content, wherein N comprises a first positive integer;

computing a set of K optimal projection matrices from the N media content features, wherein K comprises a second positive integer; and deriving media fingerprints from the media content with the computed K optimal projection matrices.

34. The method as recited in Enumerated Example Embodiment 33, wherein the extracted video content features comprise one or more of moment invariants, intensity histograms, color histograms, edge orientation histograms, motion vectors, intensity or luma/luminance related data, or color or chroma/chromaticity related data.

35. The method as recited in Enumerated Example Embodiment 33, wherein the extracted audio features comprise one or more of:
spectrograms;
chromagrams;
mel frequency cepstral coefficients (MFCC);
one or more of modified discrete cosine transform (MDCT), discrete cosine transform (DCT), fast Fourier transform (FFT) or short time Fourier transform (STFT) coefficients;
one or more of complex quadrature minor filter (CQMF) or wavelet coefficients; or
one or more time domain related features.

36. The method as recited in Enumerated Example Embodiment 33, wherein the computation of the K optimal projection matrices from the N media content features comprises:

balancing a sensitivity attribute of the media fingerprints and a robustness attribute of the media fingerprints;

wherein the sensitivity attribute and the robustness attribute are balanced with a cost function that optimizes a trade-off between the sensitivity attribute and the robustness attribute.

37. The method as recited in Enumerated Example Embodiment 33, wherein the computation of the K optimal projection matrices from the N media content features comprises:
   computing a measurement of the sensitivity attribute based on a current set of the K optimal projection matrices and the set of N extracted features.
38. The method as recited in Enumerated Example Embodiment 37, wherein the sensitivity measurement is computed based, at least in part, on mutual information that is shared within, or exists between elements of, the set of K projected values.
39. The method as recited in Enumerated Example Embodiment 38, wherein the sensitivity measurement computation comprises:
   projecting each of the N extracted features onto the current set of K optimal projection matrices.
40. The method as recited in Enumerated Example Embodiment 38, wherein the mutual information comprises a negentropy attribute that relates to the current set of K candidate projection matrices.
41. The method as recited in Enumerated Example Embodiment 40 wherein the sensitivity measurement computation further comprises:
   computing a set of non-quadratic function values for each of the K optimal projection matrices;
   computing a first average over the computed non-quadratic function values;
   computing a non-quadratic function value for a set K pseudorandom values that have a Gaussian distribution;
   computing a second average for the non-quadratic function values over the set K Gaussian-distributed pseudorandom values; and
   computing a difference between the first average and the second average, wherein the negentropy attribute relates to the computed difference.
42. The method as recited in Enumerated Example Embodiment 40, wherein the computation of the K optimal projection matrices from the N media content features comprises:
   computing a measurement of the robustness attribute based on a current set of the K candidate projection matrices and the set of N extracted features.
43. The method as recited in Enumerated Example Embodiment 42, where in the robustness measure computation comprises computing a Laplacian feature matrix that is based on the set of N extracted features and a set of weights, wherein the Laplacian feature matrix relates to a spatial neighborhood property of an area that surrounds or is in proximity to the extracted content features.
44. The method as recited in Enumerated Example Embodiment 43, wherein the Laplacian feature matrix computation comprises:
   determining a set of weighting values that relate to the spatial neighborhood; and
   computing a Laplacian Matrix based, at least in part, on the set of weighting values; and
   computing a matrix product between based on the extracted features and the Laplacian matrix.
45. The method as recited in Enumerated Example Embodiment 43, further comprising:
   updating the current set of K optimal projection matrices based, at least in part, on one or more of:
   the computation of the robustness measurement; or
   the computation of the sensitivity measurement.
46. The method as recited in Enumerated Example Embodiment 45, wherein the current set of K optimal projection matrices are updated based on Karush_Kuhn_Tucker (KKT) conditions that are imposed on the cost function, which relate to a combination of the robustness and sensitivity measurement.
47. The method as recited in Enumerated Example Embodiment 46, wherein the wherein the current set of K optimal projection matrices are updated based on a Newton approximation method.
48. The method as recited in Enumerated Example Embodiment 30, further comprising:
   comparing the current set of optimal projection matrices to a previous set of projection matrices wherein, prior to the computation of the current optimal projection matrices set, the previous set comprises a prior optimal projection matrices set; and
   computing a difference between the current set of optimal projection matrices and the previous set of projection matrices.
49. The method as recited in Enumerated Example Embodiment 48, further comprising:
   comparing the difference that is computed between the current set of optimal projection matrices and the previous set of projection matrices to a threshold value; and
   upon the comparison, wherein the difference between the current set of optimal projection matrices and the previous set of projection matrices is less than the threshold value, initializing the derivation of the media fingerprints from the media content with the current optimal projection matrices set.
50. The method as recited in Enumerated Example Embodiment 49 wherein, upon the comparison, wherein the difference between the current set of optimal projection matrices and the previous set of projection matrices is greater than or equal to the threshold value, the method further comprises the steps of:
   a) repeating the computation of the optimal projection matrices set wherein the current set of optimal projection matrices is modified;
   b) comparing the modified current set of optimal projection matrices to the previous set of projection matrices;
   c) computing a difference between the modified current set of optimal projection matrices and the previous set of projection matrices;
   d) comparing the difference that is computed between the modified current set of optimal projection matrices and the previous set of projection matrices to the threshold value; and
   e) iteratively repeating the steps a) through d) until the difference between the modified current set of optimal projection matrices and the previous set of projection matrices is less than the threshold value.
51. A method, comprising:
   identifying a plurality of candidate features that are components of one or more of audio or video content and a plurality of candidate hash functions, wherein each of the candidate hash functions comprise an array of coefficients that relate to the candidate features;
   selecting a subgroup of the hash functions, based at least in part on an optimized combination of at least two characteristics of the candidate features or the hash functions; and
   deriving fingerprints that uniquely identify the audio or video content from the selected optimized hash functions subgroup.
52. The method as recited in Enumerated Example Embodiment 51 wherein the selection of the subgroup of the hash functions based, at least in part, on the optimized combination of characteristics thereof comprises dynamic programming.

53. The method as recited in Enumerated Example Embodiment 51 wherein the hash functions comprise one or more non-linear projections.

54. The method as recited in Enumerated Example Embodiment 51 wherein the hash functions comprise one or more projection matrices.

55. A method comprising:
   extracting a plurality of N features from media content that comprises one or more of audio or video content, wherein N comprises a first positive integer;
   computing a set of K optimal hash functions from the N media content features, wherein K comprises a second positive integer; and
   deriving media fingerprints from the media content with the computed K optimal hash functions.

56. The method as recited in Enumerated Example Embodiment 55 wherein the hash functions comprise one or more non-linear projections.

57. The method as recited in Enumerated Example Embodiment 55 wherein the hash functions comprise one or more projection matrices.

58. A media fingerprint computation product that is produced by a process, which comprises:
   identifying a plurality of candidate features that are components of one or more of audio or video content and a plurality of candidate projection matrices, wherein each of the candidate projection matrices comprise an array of coefficients that relate to the candidate features;
   selecting a subgroup of the projection matrices, based at least in part on an optimized combination of at least two characteristics of the candidate features or the projection matrices; and
   deriving the media fingerprint computation product that uniquely identifies the audio or video content from the selected optimized projection matrices subgroup.

59. A media fingerprint computation product that is produced by a process, which comprises:
   extracting a plurality of N features from media content that comprises one or more of audio or video content, wherein N comprises a first positive integer;
   computing a set of K optimal projection matrices from the N media content features, wherein K comprises a second positive integer; and
   deriving the media fingerprint computation product from the media content with the computed K optimal projection matrices.

60. A media fingerprint computation product that is produced by a process, which comprises:
   identifying a plurality of candidate features that are components of one or more of audio or video content and a plurality of candidate hash functions, wherein each of the candidate hash functions comprise an array of coefficients that relate to the candidate features;
   selecting a subgroup of the hash functions, based at least in part on an optimized combination of at least two characteristics of the candidate features or the hash functions; and
   deriving the media fingerprint computation product that uniquely identifies the audio or video content from the selected optimized hash functions subgroup.

61. A media fingerprint computation product that is produced by a process, which comprises:
   extracting a plurality of N features from media content that comprises one or more of audio or video content, wherein N comprises a first positive integer;
   computing a set of K optimal hash functions from the N media content features,
   wherein K comprises a second positive integer; and
   deriving the media fingerprint computation product from the media content with the computed K optimal hash functions.

62. An apparatus, comprising:
   at least one processor; and
   a computer readable storage medium that comprises instructions, which when executed with the at least one processor, configure, program or control the apparatus to perform a process, which comprises:
   identifying a plurality of candidate features that are components of one or more of audio or video content and a plurality of candidate projection matrices, wherein each of the candidate projection matrices comprise an array of coefficients that relate to the candidate features;
   selecting a subgroup of the projection matrices, based at least in part on an optimized combination of at least two characteristics of the candidate features or the projection matrices; and
   deriving a media fingerprint that uniquely identifies the audio or video content from the selected optimized projection matrices subgroup.

63. An apparatus, comprising:
   at least one processor; and
   a computer readable storage medium that comprises instructions, which when executed with the at least one processor, configure, program or control the apparatus to perform a process, which comprises:
   extracting a plurality of N features from media content that comprises one or more of audio or video content, wherein N comprises a first positive integer;
   computing a set of K optimal projection matrices from the N media content features, wherein K comprises a second positive integer; and
   deriving a media fingerprint from the media content with the computed K optimal projection matrices.

64. An apparatus, comprising:
   at least one processor; and
   a computer readable storage medium that comprises instructions, which when executed with the at least one processor, configure, program or control the apparatus to perform a process, which comprises:
   identifying a plurality of candidate features that are components of one or more of audio or video content and a plurality of candidate hash functions, wherein each of the candidate hash functions comprise an array of coefficients that relate to the candidate features;
   selecting a subgroup of the hash functions, based at least in part on an optimized combination of at least two characteristics of the candidate features or the hash functions; and
   deriving a media fingerprint that uniquely identifies the audio or video content from the selected optimized hash functions subgroup.

65. An apparatus, comprising:
   at least one processor; and
   a computer readable storage medium that comprises instructions, which when executed with the at least one processor, configure, program or control the apparatus to perform a process, which comprises:
   extracting a plurality of N features from media content that comprises one or more of audio or video content, wherein N comprises a first positive integer;
   computing a set of K optimal hash functions from the N media content features,
   wherein K comprises a second positive integer; and
   deriving a media fingerprint from the media content with the computed K optimal hash functions.

66. A system, comprising:
 means for identifying a plurality of candidate features that are components of one or more of audio or video content and a plurality of candidate projection matrices, wherein each of the candidate projection matrices comprise an array of coefficients that relate to the candidate features;
 means for selecting a subgroup of the projection matrices, based at least in part on an optimized combination of at least two characteristics of the candidate features or the projection matrices; and
 means for deriving a media fingerprint that uniquely identifies the audio or video content from the selected optimized projection matrices subgroup.

67. A system, comprising:
 means for extracting a plurality of N features from media content that comprises one or more of audio or video content, wherein N comprises a first positive integer;
 means for computing a set of K optimal projection matrices from the N media content features, wherein K comprises a second positive integer; and
 means for deriving a media fingerprint from the media content with the computed K optimal projection matrices.

68. A system, comprising:
 means for identifying a plurality of candidate features that are components of one or more of audio or video content and a plurality of candidate hash functions, wherein each of the candidate hash functions comprise an array of coefficients that relate to the candidate features;
 means for selecting a subgroup of the hash functions, based at least in part on an optimized combination of at least two characteristics of the candidate features or the hash functions; and
 means for deriving a media fingerprint that uniquely identifies the audio or video content from the selected optimized hash functions subgroup.

69. A system, comprising:
 means for extracting a plurality of N features from media content that comprises one or more of audio or video content, wherein N comprises a first positive integer;
 means for computing a set of K optimal hash functions from the N media content features,
 wherein K comprises a second positive integer; and
 means for deriving a media fingerprint from the media content with the computed K optimal hash functions.

70. A computer readable storage medium that comprises instructions, which when executed with the at least one processor, configure, program or control the at least one processor to perform a method, which comprises:
 identifying a plurality of candidate features that are components of one or more of audio or video content and a plurality of candidate projection matrices, wherein each of the candidate projection matrices comprise an array of coefficients that relate to the candidate features;
 selecting a subgroup of the projection matrices, based at least in part on an optimized combination of at least two characteristics of the candidate features or the projection matrices; and
 deriving a media fingerprint that uniquely identifies the audio or video content from the selected optimized projection matrices subgroup.

71. A computer readable storage medium that comprises instructions, which when executed with the at least one processor, configure, program or control the at least one processor to perform a method, which comprises:
 extracting a plurality of N features from media content that comprises one or more of audio or video content, wherein N comprises a first positive integer;
 computing a set of K optimal projection matrices from the N media content features, wherein K comprises a second positive integer; and
 deriving a media fingerprint from the media content with the computed K optimal projection matrices.

72. A computer readable storage medium that comprises instructions, which when executed with the at least one processor, configure, program or control the at least one processor to perform a method, which comprises:
 identifying a plurality of candidate features that are components of one or more of audio or video content and a plurality of candidate hash functions, wherein each of the candidate hash functions comprise an array of coefficients that relate to the candidate features;
 selecting a subgroup of the hash functions, based at least in part on an optimized combination of at least two characteristics of the candidate features or the hash functions; and
 deriving a media fingerprint that uniquely identifies the audio or video content from the selected optimized hash functions subgroup.

73. A computer readable storage medium that comprises instructions, which when executed with the at least one processor, configure, program or control the at least one processor to perform a method, which comprises:
 extracting a plurality of N features from media content that comprises one or more of audio or video content, wherein N comprises a first positive integer;
 computing a set of K optimal hash functions from the N media content features,
 wherein K comprises a second positive integer; and
 deriving a media fingerprint from the media content with the computed K optimal hash functions.

74. A integrated circuit (IC) device that comprises a processing component which causes or controls a method, which comprises:
 identifying a plurality of candidate features that are components of one or more of audio or video content and a plurality of candidate projection matrices, wherein each of the candidate projection matrices comprise an array of coefficients that relate to the candidate features;
 selecting a subgroup of the projection matrices, based at least in part on an optimized combination of at least two characteristics of the candidate features or the projection matrices; and
 deriving a media fingerprint that uniquely identifies the audio or video content from the selected optimized projection matrices subgroup.

75. A integrated circuit (IC) device that comprises a processing component which causes or controls a method, which comprises:
 extracting a plurality of N features from media content that comprises one or more of audio or video content, wherein N comprises a first positive integer;
 computing a set of K optimal projection matrices from the N media content features, wherein K comprises a second positive integer; and
 deriving a media fingerprint from the media content with the computed K optimal projection matrices.

76. A integrated circuit (IC) device that comprises a processing component which causes or controls a method, which comprises:
 identifying a plurality of candidate features that are components of one or more of audio or video content and a plurality of candidate hash functions, wherein each of the candidate hash functions comprise an array of coefficients that relate to the candidate features;

selecting a subgroup of the hash functions, based at least in part on an optimized combination of at least two characteristics of the candidate features or the hash functions; and deriving a media fingerprint that uniquely identifies the audio or video content from the selected optimized hash functions subgroup.

77. A integrated circuit (IC) device that comprises a processing component which causes or controls a method, which comprises:

extracting a plurality of N features from media content that comprises one or more of audio or video content, wherein N comprises a first positive integer;

computing a set of K optimal hash functions from the N media content features, wherein K comprises a second positive integer; and deriving a media fingerprint from the media content with the computed K optimal hash functions.

78. The IC device as recited in Enumerated Example Embodiment 77 wherein the device comprises one or more of a programmable logic device (PLD), a microcontroller, a field programmable gate array (FPGA), a digital or discrete time signal processor (DSP) or an application specific IC (ASIC).

Equivalents, Extensions, Alternatives and Miscellaneous

Example embodiments relating to projection based hashing that balances robustness and sensitivity of media fingerprints are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

identifying a plurality of candidate features that are components of one or more of audio or video content and a plurality of candidate projection matrices, wherein each of the candidate projection matrices comprise an array of coefficients that relate to the candidate features;

selecting a subgroup of the projection matrices, based at least in part on an optimized combination of at least two characteristics of the candidate features or the projection matrices; and deriving fingerprints that uniquely identify the audio or video content from the selected optimized projection matrices subgroup.

2. The method as recited in claim 1 wherein the selection of the subgroup of the projection matrices based, at least in part, on the optimized combination of characteristics thereof comprises:

computing a performance measurement for each of at least two subgroups of the plurality of candidate features or the projection matrices wherein the performance measurement is based, at least in part, on a sensitivity value and a robustness value associated with each of the at least two subgroups, and a parameter related to one or more of a cost/benefit balancing or a trade off between the sensitivity value and a robustness value;

comparing the performance measurements of the at least two feature subgroups or the projection matrices; and based on the comparison, identifying a performance measurement that corresponds to one of the at least two feature subgroups or the projection matrices as an optimal performance measurement;

wherein one feature subgroup is selected from among the at least two feature subgroups or the projection matrices based, at least in part, on the identification of the optimal performance measurement.

3. The method as recited in claim 2 wherein:

a population of the plurality of candidate projection matrices comprises a number N;

the optimal subgroup is populated by a number W of the N projection matrices;

the number N is greater than the number W; and the selecting step comprises, upon the selection of a most optimal feature subgroup from among the N candidate features or the projection matrices, recursively performing the selecting step, wherein a subsequent next most optimal, in relation to the most optimal, subgroup is selected from among the remaining candidate features or the projection matrices.

4. The method as recited in claim 3 wherein the selecting step further comprises continuing the recursive repetition over subsequently remaining candidate features or the projection matrices until the W optimal subgroups are all identified or selected.

5. The method as recited in claim 4 wherein the recursive repetition comprises:

a) computing a first subgroup performance measurement for a current subgroup of the projection matrices based, at least in part, on a robustness value and a sensitivity value of the current candidate subgroup;

b) computing a subgroup performance measurement for a candidate subgroup, which is subsequent to the first candidate subgroup, from the remaining projection matrices based, at least in part, on the robustness value and the sensitivity value of the subsequent candidate subgroup;

c) combining each of the candidate projection matrices that remain after the first current candidate projection matrix subgroup performance measurement computation with the original current subgroup, wherein new candidate projection matrix subgroups, each subsequent in relation to the original candidate features or the projection matrices subgroup and each uniquely corresponding to one and only one of each of the remaining candidate projection matrices, is formed; and d) computing a subgroup performance measurement for each of the new candidate projection subgroups, based, at least in part, on the robustness value and the sensitivity value of the subsequent candidate subgroup.

6. The method as recited in claim 5 wherein the recursive repetition comprises:

e) comparing each of the new subgroup performance measurements with the current or original subgroup of the candidate features or the projection matrices and each other of the new subgroup performance measurements;

wherein it is determined whether one of the new computed subgroup performance measurements exceeds or is more optimal than the current or original subgroup of the candidate features or the projection matrices or each of the other new computed subgroup performance measurements.

7. The method as recited in claim 6 wherein the recursive repetition further comprises:

f) upon the comparison determining that one of the new subgroup performance measurements exceeds or is more optimal than the current or original subgroup of the or each of the other new computed subgroup performance measurements, updating the current or original candidate subgroup, wherein the new subgroup, which is determined to have the performance measurement that exceeds or is more optimal than the current or original subgroup, is added thereto to comprise an updated current optimized subgroup.

8. The method as recited in claim 7 wherein the recursive repetition further comprises:
   g) upon the comparison, further determining whether W items remain in the optimal subgroup.

9. The method as recited in claim 8 wherein the recursive repetition further comprises:
   h) upon the further determination that less than W projection matrices remain in the optimal subgroup, adding one additional candidate projection matrix, to the most optimal subgroup, wherein a newly updated current optimal subgroup of candidate projection matrices s formed; and
   i) repeating steps a) through g) over the newly updated current optimal projection matrices subgroup.

10. The method as recited in claim 2 wherein the performance measurement computation for each of at least two subgroups of the plurality of candidate features comprises:
   deriving a first fingerprint codeword based on a subgroup of features in an original instance of media content;
   deriving one or more additional fingerprint codewords based on a subgroup of features in a content instance that comprises a modification of the original media content; and
   for each of the one or more additional fingerprint codewords derived from the modified content instance, computing a difference between each of the one or more additional codewords, wherein a set of corresponding difference values is generated, wherein the corresponding difference values, wherein the difference values relate to a Hamming similarity between the first fingerprint codeword and the one or more additional codewords;
   wherein the robustness value is based, at least in part, on the computed difference values.

11. The method as recited in claim 2 wherein the performance measurement computation for each of at least two subgroups of the plurality of candidate features or the projection matrices wherein the performance measurement is based, at least in part, on a sensitivity value and a robustness value associated with each of the at least two subgroups further comprises:
   deriving a first set of projected values that correspond to the original media content instance based on the subgroup of features in the original instance of media content and the projection matrices;
   deriving a second set of projected values that correspond to the modified media content instance based on the subgroup of features in the modified instance of media content and the projection matrices;
   computing a difference between one or more of:
      the features in the original media content instance and the features in the modified media content instance; or
      the first set of original media content instance projected values and the second set of modified media content instance projected values;
   wherein the robustness is determined based on the computed difference.

12. The method as recited in claim 2, further comprising computing the sensitivity value of the optimal subgroup;
   wherein the computation of the optimal subgroup sensitivity comprises:
   for each image of a plurality of images, or for each audio content portion of a plurality of audio content portions, which respectively comprise the video or audio content, deriving a plurality of fingerprint codewords, each codeword comprising a number n of bits, based on the optimal subgroup of image or audio content portion features;
   analyzing a distribution of the codewords over a set of possible codewords that each comprise n bits; and
   determining the sensitivity value based on a minimal distribution of the codewords over the set of possible n-bit codewords.

13. The method as recited in claim 1, further comprising:
   identifying a plurality of candidate projection matrices that relate to values, which correspond to one or more features that comprise components of underlying media content;
   selecting an optimal subgroup of projection matrices from the plurality of candidate projection matrices;
   wherein the selection of the optimal subgroup of the projection matrices is based, at least in part, on the optimized combination of characteristics thereof comprises dynamic programming; and
   deriving fingerprints based on the selected optimal projection matrices.

14. The method as recited in claim 13, wherein the selecting step comprises:
   computing a performance measurement for each subgroup of at least two subgroups of the plurality of candidate projection matrices;
   wherein the performance measurement is based, at least in part, on:
      a sensitivity value associated with each of the subgroups;
      a robustness value associated with each of the subgroups; and
      a parameter that relates to a balance of, or a trade-off between the sensitivity value and the robustness value;
   identifying an optimal performance measurement for at least one of the subgroups; and
   selecting the identified optimally performing subgroup for the plurality of projection matrices.

15. A method, comprising:
   identifying a plurality of candidate features that are components of one or more of audio or video content and a plurality of candidate hash functions, wherein each of the candidate hash functions comprise an array of coefficients that relate to the candidate features;
   selecting a subgroup of the hash functions, based at least in part on an optimized combination of at least two characteristics of the candidate features or the hash functions; and
   deriving fingerprints that uniquely identify the audio or video content from the selected optimized hash functions subgroup.

* * * * *